(12) United States Patent
Oder et al.

(10) Patent No.: US 7,108,768 B2
(45) Date of Patent: Sep. 19, 2006

(54) SAFETY LOCK BOLTLESS CLOSURES

(75) Inventors: John W. Oder, Houston, TX (US); Leslie P. Antalffy, Houston, TX (US); Michael B. Knowles, Missouri City, TX (US); Samuel A. Martin, Sugarland, TX (US); George T. West, Houston, TX (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 281 days.

(21) Appl. No.: 10/478,391

(22) PCT Filed: Oct. 11, 2002

(86) PCT No.: PCT/US02/32792

§ 371 (c)(1),
(2), (4) Date: Jul. 7, 2004

(87) PCT Pub. No.: WO03/040260

PCT Pub. Date: May 15, 2003

(65) Prior Publication Data

US 2004/0238342 A1 Dec. 2, 2004

Related U.S. Application Data

(60) Provisional application No. 60/330,235, filed on Oct. 17, 2001, provisional application No. 60/330,236, filed on Oct. 17, 2001.

(51) Int. Cl.
 *C10B 1/00* (2006.01)
(52) U.S. Cl. ............... 202/242; 202/244; 202/245; 202/246; 202/250; 202/262
(58) Field of Classification Search ............... 202/242, 202/244, 245, 246, 250, 262
See application file for complete search history.

(56) References Cited

U.S. PATENT DOCUMENTS

| | | | | |
|---|---|---|---|---|
| 5,098,524 A | * | 3/1992 | Antalfy et al. | 202/96 |
| 5,221,019 A | * | 6/1993 | Pechacek et al. | 220/315 |
| 6,022,454 A | * | 2/2000 | Fetzer | 202/242 |
| 6,228,225 B1 | * | 5/2001 | Meher-Homji | 202/250 |

* cited by examiner

*Primary Examiner*—Glenn Caldarola
*Assistant Examiner*—Alexis Wachtel
(74) *Attorney, Agent, or Firm*—Rutan & Tucker, LLP

(57) ABSTRACT

An apparatus comprises a movable lock ring and a lock arm that prevents inadvertent movement of the lock ring. Contemplated configurations are especially useful in delayed coking vessels to prevent opening of the vessel while the vessel is in operation.

15 Claims, 3 Drawing Sheets

SAFETY LOCK BOLTLESS CLOSURES

This application claims priority to provisional application 60/330,235 filed Oct. 17, 2001 and provisional application 60/330,236 filed Oct. 17, 2001, both of which are incorporated by reference herein.

FIELD OF THE INVENTION

The field of the invention is safety devices for boltless closures, and especially as they relate to deheading devices for coking vessels.

BACKGROUND OF THE INVENTION

Delayed coking is a relatively common process in which heavy fuel constituents are converted into lighter products (e.g., gasoline or diesel) using relatively harsh conditions (e.g., temperatures above 900° F.) over a period of between about 18–24 hours. The coking process is typically carried out in large coke drums, often 27–29 feet in diameter and approximately 130 feet in height. To ensure continuous operation, refineries normally operate multiple coke drums, wherein at least one coke drum is coking while at least another one is decoked.

In a typical coking vessel configuration, hydrocarbonaceous feedstock is fed from a pipe through the bottom flange of the coke drum and a blind flange is bolted onto the coke drum's upper flange during the delayed coking process. Once the coking process is complete and the coke drum has been quenched and cooled, the blind flange and the bottom head of the drum are disconnected from the vessel to cut and remove the coke. Due to the operating conditions in the coking vessel, manual removal of the blind flange and the bottom head has traditionally been time consuming and hazardous to operations personnel, especially because of the hazardous vapors and pressurized steam that may escape from the upper flange and/or lower opening of the coke drum during removal of the blind flange and the bottom head.

The deheading operation during the delayed coking process has been replaced in some instances by fully automated devices such as U.S. Pat. No. 5,221,019 to Pechacek, et al., U.S. Pat. No. 6,264,829 to Antalffy et al., U.S. Pat. No. 6,113,745 to Antalffy et al., U.S. Pat. No. 5,846,034 to Martin et al., U.S. Pat. No. 5,785,843 to Antalffy et al., U.S. Pat. No. 5,628,603 to Antalffy et al., and U.S. Pat. No. 5,098,524 to Antalffy et al., which address the removal of the bottom head or cover of a coke drum. Similarly, removal of the blind flange has been automated as described in U.S. Pat. No. 6,228,225 to Meher-Homji (All U.S. patent references incorporated by reference herein).

While automation of deheading operations in a petroleum coking unit considerably reduces risk of personal injury to operating personnel, new difficulties may arise. Most significantly, a remote operator is may inadvertently open a coking vessel while the vessel is still operating or not completely quenched since the operator is less acutely aware of the state of the coke drum process cycle. For example, if a hatch, or head, is too hot for an operator to manually remove fasteners safely, then the drum is probably still in service, and should not be opened. However, if the hatch or head removal is automated and remotely operated, and controlled by a unit that controls multiple drums, then the possibility exists the an operator could inadvertently open a drum in service.

Therefore, although various configurations and processes are known in the art to unhead a coking vessel, all or almost all suffer from one or more disadvantages. Thus, there is still a need for improved configurations and processes for safety locks, and especially for safety locks for a blind flange and/or bottom head of a coking vessel.

SUMMARY OF THE INVENTION

The present invention is directed to various aspects and configurations that include a movable lock ring and a lock arm that prevents inadvertent movement of the lock ring. In a generally preferred aspect, an apparatus has a lock ring that is moved by an actuator between a first and second position and further comprises a lock arm that is movable between a first and second position, wherein the lock arm prevents movement of the actuator when the lock arm is in the first position. Particularly preferred configurations and methods are especially useful in top blind flanges and bottom heads of coking vessels.

In one aspect of the inventive subject matter, the lock arm (preferably moved by an lock arm actuator) is coupled to the actuator, and in especially contemplated configurations, suitable apparatus include a second actuator, wherein the lock arm moves at least partially into a space between the actuator and the second actuator, and wherein the space is formed when the actuator is in the first position.

In another aspect of the inventive subject matter, the actuator is coupled to a coking vessel and the lock ring is coupled to the coking vessel via the actuator. Contemplated coke vessels may further comprise a head closure or a bottom head, wherein the head closure or bottom head are secured to the coking vessel using the lock ring when the actuator is in the first position. It is still further preferred that movement of the lock arm between the first and second position is dependent on temperature and/or pressure in the coking vessel.

In a further aspect of the inventive subject matter, the apparatus may comprise a first and a second conduit, wherein actuator is coupled to the first conduit, wherein the first and second conduits are secured together when the actuator is in the first position.

In yet another aspect of the inventive subject matter, a delayed coking vessel includes a vessel with an opening, and a closing element. A ring is preferably coupled to the vessel and movable between a first and second position, wherein the opening is closed by the closing element when the ring is in the first position and wherein the opening is opened by the closing element when the ring is in the second position. An actuator is coupled to the vessel and moving the ring between the first and second position, and a lock arm may be coupled to the actuator and movable between a first and second position, wherein movement of the actuator is blocked when the lock arm is in the first position.

Various objects, features, aspects and advantages of the present invention will become more apparent from the following detailed description of preferred embodiments of the invention, along with the accompanying drawing.

DETAILED DESCRIPTION

As used herein, the term "lock ring" refers to a ring-shaped (and generally circular) device that releasably engages with two elements, wherein both elements contact directly or indirectly the device, and wherein the two elements are secured to each other when the lock ring is in a first position (relative to one element) and can be disconnected from each other when the lock ring is in a second position (relative to the one element). Particularly contemplated elements include an end (preferably flanged) of a conduit (e.g., open end of a pipe) or vessel (e.g., top or bottom opening of a coking vessel), and an exemplary suitable lock ring is described in U.S. Pat. No. 5,048,876 to Wallskog, which is incorporated by reference herein.

As also used herein, the term "the lock arm prevents movement of the actuator" means that the lock arm, when in locking position, will provide a counter force or steric obstacle to the actuator such that the actuator can execute a movement that is no more than 30%, more typically no more than 10%, even more typically no more than 5%, and most typically no more than 2% of the movement as compared to when the lock arm is in the non-locking position. Furthermore, movement of the actuator includes direct and indirect movement, wherein direct movement refers to movement in which the actuator provides the moving force, while indirect movement refers to a movement in which a device other than the actuator provide the moving force.

The inventors discovered that inadvertent opening of a lock ring can be prevented in an apparatus, wherein the apparatus has a lock ring that is moved by an actuator between a first and second position and further comprises a lock arm that is movable between a first and second position, wherein the lock arm prevents movement of the actuator when the lock arm is in the first position.

Figure 1A:
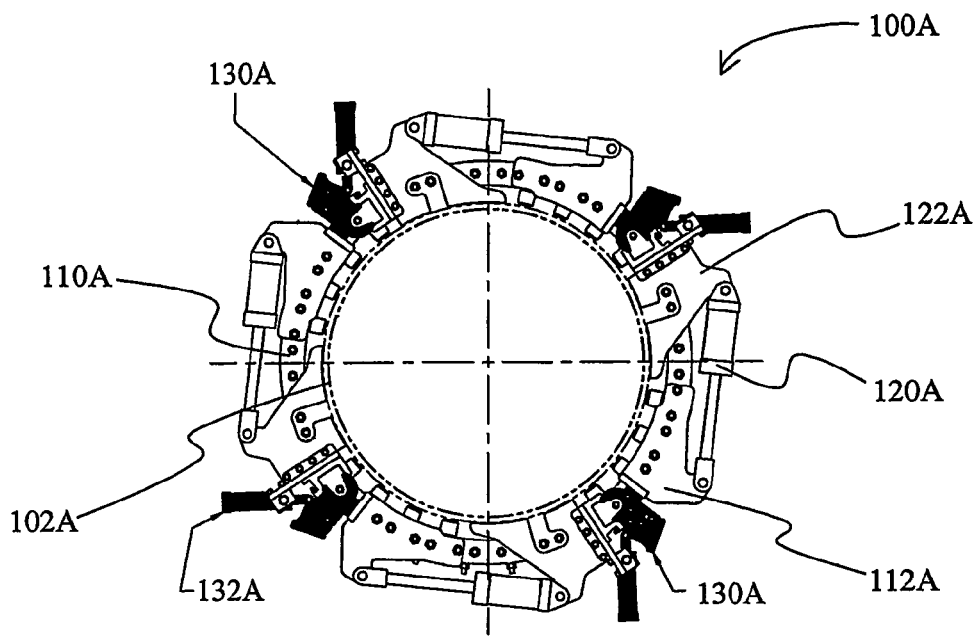
FIGS. 1A–1D are schematic views of an exemplary boltless closure moving from an open (1A) to a closed (1D) configuration.

A particularly preferred configuration is depicted in FIGS. 1A to 1D. In FIG. 1A, an apparatus 100 has a lock ring 110A that is movably (here: rotatably) and circumferentially disposed around the bottom end of a coking vessel 102A. Coupled to the bottom end of the vessel 102A (and preferably in a fixed position relative to the coking vessel 102A) is an actuator lug 122A to which actuator 120A is coupled. Actuator 120A is further coupled to the lock ring 110A via lug 112A. Thus movement of the actuator will rotate the lock ring 110A around the bottom of the coking vessel 102A. Further coupled to the actuator 120A via actuator lug 122A is a lock arm 130A, wherein movement of the lock arm 130A is effected by lock arm actuator 132A.

Figure 1B:
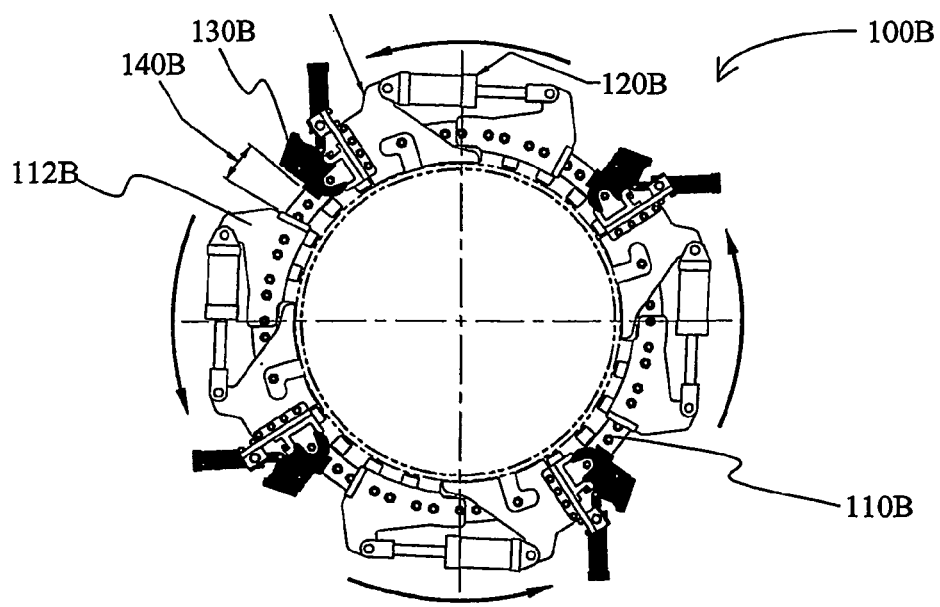
Figure 1C:
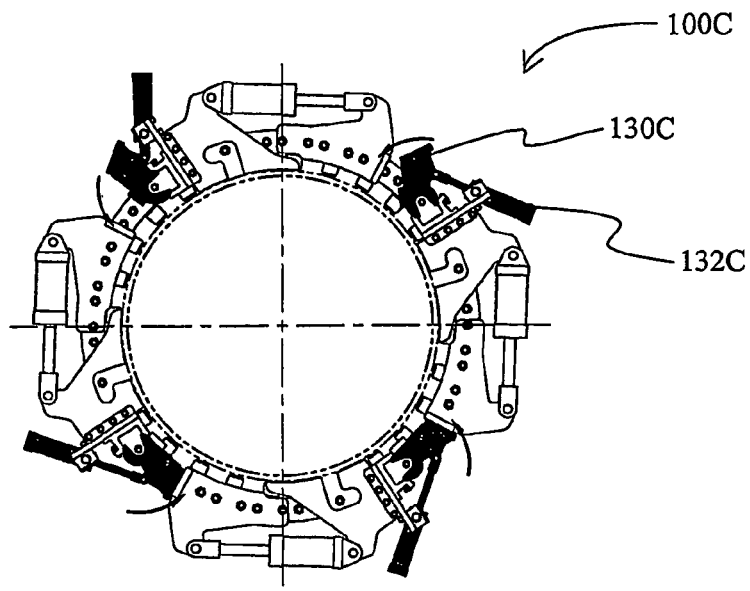
Figure 1D:
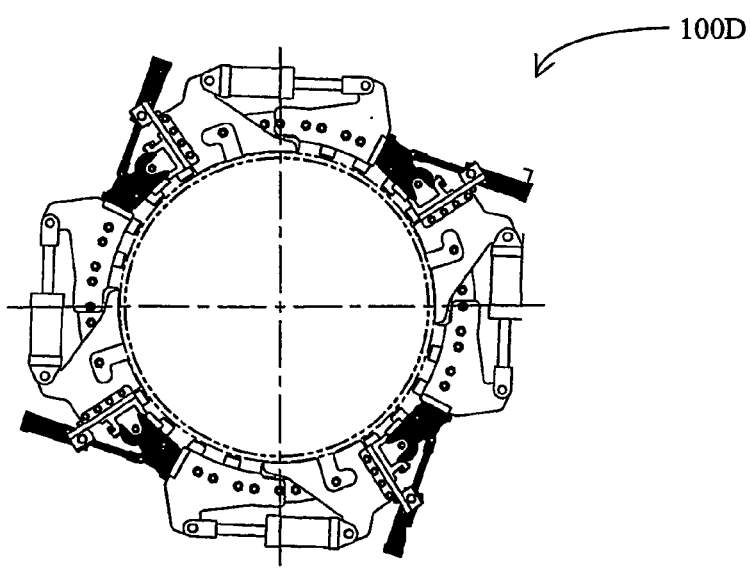

FIG. 1B indicates movement of the actuator 120B which effects circular movement of the lock ring 110B. In addition to the actuator 120B, three additional actuators (not enumerated) are coupled to the bottom of the coking vessel in a manner substantially similar to the manner described above. Movement of the actuators creates a breach 140B between the lock arm 130B and the lug 112B. Lock arm 130C is then moved into the breach 140C by the lock arm actuator 132C as depicted in FIG. 1C. After all lock ring actuators have moved from the open to the closed position (and with that secured the bottom head (not shown) to the bottom of the coking vessel 102), all of the lock arm actuators will move the lock arms into the closed position as shown in FIG. 1D. It should be particularly pointed out that the lock arms in such configurations would exert an opposing force against the lock ring actuators in case the lock ring actuators are inadvertently operated.

With respect to suitable lock rings, it is generally contemplated that all lock rings are appropriate for use in conjunction with the teachings presented herein so long as such lock rings removably secure two elements together. However, especially contemplated lock rings include those that secure a closing element (e.g., bottom head or blind flange) to a delayed coking vessel. There are numerous configurations for lock rings (typically boltless closures using a ring) known in the art and all of those are contemplated herein. Exemplary lock rings can be found in U.S. Pat. No. 5,048,876 to Wallskog, which is incorporated by reference herein.

It is further contemplated that suitable lock rings may be coupled to the coking vessel or closing element in various configurations, and all manners of coupling that (at least temporarily) retain the lock ring with the coking vessel or the closing element are deemed appropriate. For example, the lock ring may be directly coupled to the closing element, wherein the lock ring slidable engages with the closing element. On the other hand, the lock ring may also be indirectly coupled to the coking vessel via one or more actuators, wherein the actuator is coupled to the vessel using a first lug, and wherein the actuator is coupled to the lock ring using a second lug. Therefore, contemplated couplings include protrusions (e.g. mounting lugs), direct removable fasteners (e.g., bolts, screws, etc.), non-removable fasteners (e.g., by welding), and actuators.

In further aspects of the inventive subject matter, the nature of suitable actuators will typically depend on the particular configuration. For example, where desirable, suitable actuators may be at least partially manually operated (e.g., using a winch). However, it is generally preferred that suitable actuators are automatic actuators. Therefore, particularly preferred actuators include hydraulic cylinders, pneumatic actuators, electric actuators, mechanical (e.g., manually operated) actuators, motor operated cables, rack and pinion devices, etc. Still further, it is contemplated that the number of actuators that move the lock ring may vary considerably and will at least in part depend on the size of the lock ring, the power of the actuator, and the particular nature of the actuator. However, it is generally preferred that contemplated devices include at least one actuator, and most preferably between one and four actuators. Thus, in preferred configurations an actuator (more preferably a plurality of actuators) is coupled to a coking vessel, wherein the actuator is further coupled to a lock ring.

Similarly, operation of the actuator may vary considerably, and a particular mode of operation will typically depend on the particular nature of the actuator. However, it is generally preferred that the actuator is operated in an automatic mode (i.e., without the operator manually operating the actuator), wherein the operator is in a remote location relative to the actuator. The term "remote location relative to the actuator" means that the operator is in a distance or position sufficient to prevent significant bodily harm to the operator if operation of the actuator generates a hazardous condition. Thus, the remote location and/position includes physical distance of at least 10 feet, more typically at least 25 feet, and most typically at east 100 feet, and may further include a protective guard between the operator and the actuator.

Furthermore, it should be recognized that the lock arms may have various configurations. However, it is generally contemplated that the lock arm is configured such that the lock arm is movable between a first and second position, wherein the lock arm will prevent movement of the lock ring actuator when the lock arm is in the first position, and wherein the lock arm will allow movement of the lock ring actuator when the lock arm is in the second position.

For example, in a particularly preferred aspect of the inventive subject matter, the lock arm has a generally longitudinal shape with a pivot point on one end that rotates around an axis that is coupled to the actuator lug (which is affixed to the coking vessel). The other end of the lock arm includes a contact surface that is configured to at least partially match a surface on a lug on the lock ring to which the actuator is coupled (see e.g., FIGS. 1A–1D). In such configurations, the lock arm is facing away from the coking vessel in the first position, and will be substantially parallel to the coking vessel and engaged with the actuator lug of the lock ring in the second position. Thus, the lock arms will exert an opposing force against the lock ring actuators in case the lock ring actuators are inadvertently operated.

It is still further preferred that contemplated devices will further comprise a second actuator (e.g., coupled to the coking vessel via a second actuator lug), wherein the lock arm moves at least partially into a space between the actuator and the second actuator, wherein the space is formed when the actuator moves from a second to a first position. An exemplary configuration of such devices is depicted in FIGS. 1A–1D.

In alternative aspects of the inventive subject matter, however, the lock arm may have numerous alternative shapes, coupling points, and/or engagement points with the lock ring or other structure. For example, the lock arm may be directly or indirectly coupled to the coking vessel using a structure other than the actuator lug (e.g., separate lug, or welded or otherwise directly affixed to the coking vessel). Furthermore, and independent of the mode of coupling the lock arm to the coking vessel, the lock arm may engage with a structure other than lock ring lug. For example, the lock arm may directly or indirectly engage with the lock ring. Alternatively, the lock arm may also engage with a portion of the coking vessel.

Consequently, movement of suitable lock arms need not be restricted to a pivoting motion between the first and second position. For example, where the lock arm is a bolt or pin that is coupled to the actuator lug, the lock arm may be moved downwards (relative to the ground) in a movement in which the bolt engages with the lock ring in a corresponding opening. Similarly, where the lock arm is an eccentrically mounted disc, the lock arm may be rotated around an axis coupled to the coking vessel or actuator lug.

With respect to moving the lock arm between the first and second position, it is contemplated that all known manners of moving are considered suitable for use herein. However, it is especially preferred that movement of the lock arm is automatic, i.e., without direct and manual contact of the lock arm by the operator. Consequently, particularly suitable manners of moving the lock arm include moving the lock arm using an (remotely controlled) actuator, wherein especially preferred actuators include hydraulic cylinders, motor driven cables, etc.

In a further especially preferred aspect, movement of the lock arm between the first and second position is dependent on the temperature and/or pressure in the coking vessel. In such configurations, a temperature and/or pressure sensor coupled to the coking vessel (or other component such as the bottom head, the blind flange, etc.) may provide temperature and/or pressure information to the operator and/or operating equipment that (a) alerts the operator that the vessel should not be opened and/or (b) prevents the operator from opening the vessel by rotating the closing element. Alternatively, the lock arm may be provided with a locking mechanism that prevents movement of the lock arm due to thermal expansion of the locking mechanism at temperatures and/or pressures at which the vessel should not be opened. Suitable locking mechanisms may include bimetallic switches, hydraulic oil, etc. Therefore, and especially where the movement of the lock arm is dependent on the temperature and/or pressure of the coking vessel, it should be recognized that the risk of inadvertent opening of a coking vessel is significantly reduced.

Thus, a particularly preferred configuration may comprise a delayed coking vessel in which the vessel has an opening and a closing element. A ring is coupled to the vessel and movable between a first and second position, wherein the opening is closed by the closing element when the ring is in the first position and wherein the opening is opened by the closing element when the ring is in the second position. Preferred configurations further include an actuator coupled to the vessel and moving the ring between the first and second position, and a lock arm coupled to the actuator and movable between a first and second position, wherein movement of the actuator is blocked when the lock arm is in the first position.

Figure 2:
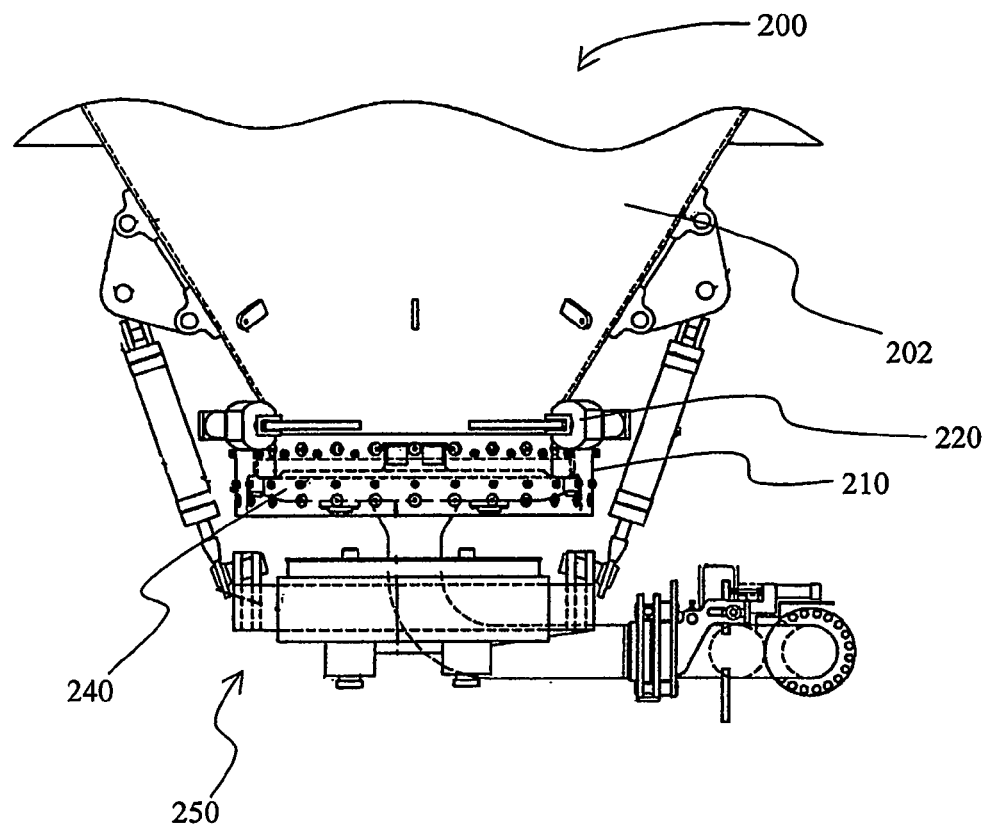
FIG. 2 is a schematic view of an exemplary delayed coking vessel with an exemplary boltless closure.

An exemplary configuration of such delayed coking vessels is depicted in FIG. 2, wherein the vessel 200 has a generally conical lower portion 202 to which a lock ring 210 is coupled via actuators 220. The lock ring 210 secures the bottom head 240 to the coking vessel 202, which is received by a balanced handler frame 250 after the lock ring releases the bottom head from the coking vessel. With respect to the particular details of the structure, coupling, and operating of the lock ring (including lock arms), reference is made to FIGS. 1A–1D.

Figure 3:
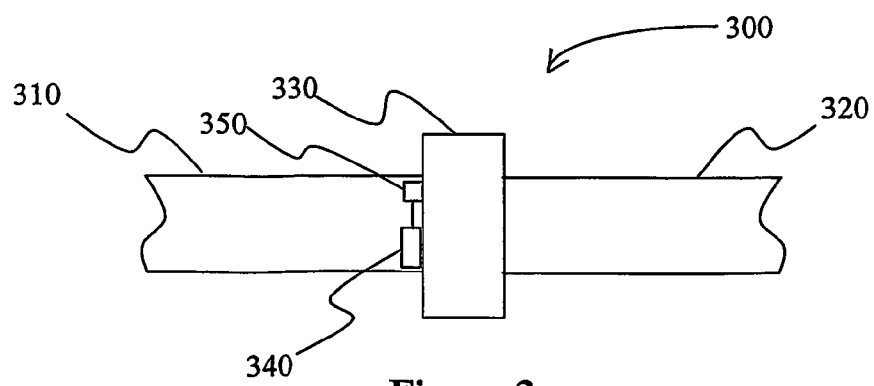
FIG. 3 is a schematic view of an exemplary conduit assembly an exemplary boltless closure.

Alternatively, suitable configurations may also be employed in devices other than a coking vessel, and it is generally contemplated that all configurations are suitable in which two elements are coupled together by a lock ring. Consequently, contemplated alternative devices may include a first and a second conduit (or blind flange), wherein an actuator is coupled to the first conduit and moves the lock ring between the first and second position (e.g., wherein the first and second conduits are secured together when the actuator is in the first position). An exemplary alternative configuration is depicted in FIG. 3, in which device 300 has a first conduit 310 and a second conduit 320. Lock ring 330 is coupled to the first conduit 310 via actuator 340, and lock arm 350 prevents inadvertent opening in configurations and manner as described in FIGS. 1A–1D.

Thus, specific embodiments and applications of safety lock for boltless closures have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An apparatus comprising a lock ring moved by a first actuator between a first and second position, and further comprising a lock arm that is coupled to the apparatus, wherein the lock arm is actuated by a second actuator and movable between a first and second position, and wherein the lock arm prevents movement of the first actuator when the lock arm is in the first position.

2. The apparatus of claim 1 wherein the lock arm is coupled to the first actuator.

3. The apparatus of claim 1 further comprising a third actuator, wherein the lock arm moves at least partially into a space between the first actuator and the third actuator, and wherein the space is formed when the first actuator is in the first position.

4. The apparatus of claim 1 comprising a vessel, wherein the first actuator is coupled to the vessel.

5. The apparatus of claim 4 wherein the lock ring is coupled to the vessel via the first actuator.

6. The apparatus of claim 4 further comprising a head closure or a bottom head, wherein the head closure or bottom head are secured to the vessel using the lock ring when the first actuator is in the first position.

7. The apparatus of claim 4 wherein movement of the lock arm between the first and second position is dependent on at least one of a temperature and a pressure in the vessel.

8. The apparatus of claim 1 comprising a first and a second conduit, wherein the first actuator is coupled to the first conduit.

9. The apparatus of claim 8 wherein the first and second conduits are secured together when the first actuator is in the first position.

10. A vessel comprising:
a vessel with an opening, and a closing element;
a ring coupled to the vessel and movable between a first and second position, wherein the opening is closed by the closing element when the ring is in the first position and wherein the opening is opened by the closing element when the ring is in the second position;
a first actuator coupled to the vessel and moving the ring between the first and second position; and
a lock arm coupled to the apparatus, wherein the lock arm is actuated by a second actuator and movable between a first and second position, wherein movement of the first actuator is blocked when the lock arm is in the first position.

11. The vessel of claim 10 wherein the closing element is a head closure.

12. The vessel of claim 10 further comprising third actuator, wherein the lock arm moves at least partially into a space between the first actuator and the third actuator, and wherein the space is formed when the ring is in the first position.

13. The vessel of claim 10 wherein movement of the ring between the first and second position is dependent on at least one of a temperature and a pressure in the vessel.

14. The vessel of claim 10 wherein the first actuator comprises a hydraulic actuator, a pneumatic actuator, an electric actuator, or a mechanical actuator.

15. The vessel of claim 10 wherein the closing element is coupled to a balanced handler frame.

* * * * *